United States Patent Office 3,501,472
Patented Mar. 17, 1970

3,501,472
PYRAZINE PESTICIDES AND THEIR PREPARATION
Robert D. Wilcox, Palo Alto, Dorothy J. Horne, Oakland, and Howard Johnston, Walnut Creek, Calif., assignors to The Dow Chemical Company, Midland, Mich., a corporation of Delaware
No Drawing. Filed Jan. 29, 1968, Ser. No. 701,055
Int. Cl. C07d *51/176;* A01n *9/12, 9/22*
U.S. Cl. 260—250               22 Claims

ABSTRACT OF THE DISCLOSURE

Disclosed are, as new compounds, halochlorinated methyl pyrazines and their corresponding ethers and thioethers and N-oxides, compositions incorporating them, methods for their preparation, and methods for their use as pesticides.

---

The present invention relates to certain novel organic compounds, compositions incorporating them as the active agent, and methods for their use and preparation.

More particularly, this invention is directed at a series of novel pyrazine derivatives, their preparation, and their use as pesticides. These compounds are represented by the following structural Formula A:

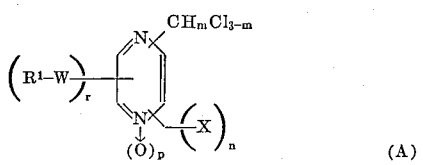

(A)

wherein:

W is an oxygen atom, a sulfur atom, a sulfinyl group, or a sulfonyl group;
$R^1$ is an alkyl, cycloakyl, aryl, alkaryl, or aralkyl group;
X is bromo or chloro;
$m$ is the integer 0, 1, or 2;
$n$ is the integer 1, 2, or 3;
$p$ is the integer 0 or 1; and
$r$ is the integer 0 or 1;

The sum of $n$ and $r$ being the integer 1, 2, or 3; provided that W is other than a sulfur atom when $p$ is the integer 1.

Thus included within the generic scope of the novel pyrazine compounds of the present invention, as represented by the above Formula A together with its attendant definitions, are chlorinated methyl pyrazines which contain, in addition and in combination with such chlorinated methyl substituent, one, two, or three bromo and/or chloro substituents. The pyrazine ring can be alternatively or further but optionally substituted with an ether, thioether, sulfinyl, or sulfonyl grouping. Also included within the scope of such halo, chlorinated methyl pyrazines optionally further substituted are the corresponding mono-N-oxides with the restriction excluding the N-oxides of the thioether series.

Preferred of these compounds are the monohalo, dichloromethyl pyrazines wherein, in the above Formula A, each of $m$ and $n$ is 1 and the monohalo, trichloromethyl pyrazines wherein $m$ is 0 and $n$ is 1. Further preferred are the polyhalogenated pyrazines otherwise directly corresponding to the above preference in which $n$ is the integer 2 or 3, preferably 2.

Also preferred members of the above represented and defined generic group are the ether, thioether, sulfinyl, and sulfonyl derivatives of the halo, chlorinated methyl compounds as well as the mono-N-oxides thereof (with the restriction in the thioether series), that is, wherein $p$ is the integer 1 and/or $r$ is the integer 1 in the above. These preferred compounds are represented subgenerically by structural formula B:

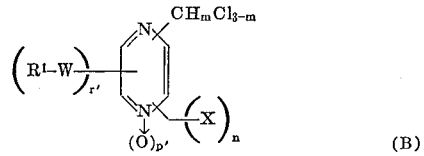

(B)

wherein each of $R^1$, W, X, $m$ and $n$ is as hereinbefore set forth; each of $p'$ and $r'$ is the integer 0 or 1, at least one of $p'$ and $r'$ being the integer 1. Thus included via this latter representation are pyrazines containing, besides at least one halo substituent (X) and a chlorinated methyl substituent ($CH_mCl_{3-m}$); an ether, thioether, sulfinyl, or sulfonyl grouping (—W—$R^1$) and/or a mono-N-oxide moiety, the latter being excluded in the thioether series ($r'$ is 1 and W is a sulfur atom).

By way of further preference of these latter represented (Formula B), preferred members are the ethers and thioethers in the monobromo, dibromo, monochloro, and dichloro series containing, in addition, a dichloromethyl or trichloromethyl group; that is, those pyrazines represented by Formula B above in which W is oxygen or sulfur, X is bromo or chloro, $m$ is the integer 0 or 1, $n$ is the integer 1 or 2, and, of course, at least one of $p'$ and $r'$ is the integer 1, $R^1$ being as defined hereinbefore.

For the purposes of the present invention, the terms used in the specification are defined as follows. By the term "alkyl" is meant a straight or branched chain saturated aliphatic hydrocarbon group containing from 1 to 12 carbon atoms, inclusive. Preferred of these are those alkyl groups containing from 1 to 6 carbon atoms, such as methyl, ethyl, propyl, butyl, pentyl, and hexyl as well as the various geometric isomers thereof. The term "cycloalkyl" includes saturated cycloaliphatic hydrocarbon groups, preferably cyclohexyl.

The term "aryl" defines a substituted or unsubstituted aromatic hydrocarbon group, notably but not exclusively embracing the benzene and naphthalene nuclei. Nuclear substituents on such aryl groups include the halogens, in particular chlorine and bromine, nitro, cyano, amino, and the like. "Alkaryl" groups are related to the substituted aryl groups defined above, the substituent in this instance being an alkyl group usually of from 1 to 6 carbon atoms. The "aralkyl" term defines an alkyl group substituted with an aryl radical, such as benzyl, phenethyl, and the like. The arrow ($\downarrow$) between the nitrogen and oxygen atoms represents the adopted manner of indicating the nitrogen oxides hereof.

The compounds hereof are pesticides and as such represent the novel method aspect of the present invention. For example, these compounds are useful as anthelmentics, fungicides, insecticides, microbiocides, and the like. They are particularly useful, especially in the outlined preferred series, as anthelmentics, fungicides, and insecticides.

The novel method aspect of the present invention involves contacting the target pest with a pesticidal amount of a pesticide hereof as outlined above, or a composition thereof, through usual and conventional manners.

In one particular use hereof, the compounds or their compositions are employed to effect the control of plant related fungi, such as that causing rice blast, by their administration to the microorganism or its habitat. Other fungal or bacterial organisms which act as pests, such as *Staphylococcus aureus, Trichophyton mentagrophytes, Candida albicans, Cercosphora beticola,* and so forth, are similarly controlled by the compounds hereof.

In addition, the compounds hereof are effective in the control of certain arthropods such as the two-spotted spider mite. As an anthelmentic they are active, for example, for the control of the mouse tapeworm. These compounds can also be used to control trash fish or other aquatic pests. Thus, excellent controls of Daphnia are achieved through contact thereof with aqueous medium containing an active compound of the present invention.

The pesticidal amount depends largely upon the manner of distribution, the type of pest being treated and its extent or severity of development, and the degree of control desired or required for any particular purpose. Generally, the effective, or pesticidal, dosage ranges from 1 to 10,000 or more parts of toxicant per million parts of applied composition. Oftentimes, it is advantageous to apply compositions containing from 1 to 10 percent by weight of the active compound.

In the administration of such compounds in accordance with their pesticidal properties, they may be employed directly or be suitably incorporated in compositions which contain other ingredients which facilitate and cooperate in their distribution and handling. Such compositions can take the form of emulsifiable liquid concentrates, wettable powder or dust formulations, and the like.

The emulsifiable liquid concentrates are formulations of the active pyrazine compound in a suitable organic solvent therefor, such as alcohols, alkyl ethers of glycols and polyglycols, ketones, aromatics, and petroleum distillates, and an anionic or nonionic emulsifying agent or a mixture thereof. Such emulsions are preferably designed such that they are self-dispersing with good stability characteristics.

The dust formulations are prepared by dispersing the solid active toxicant pesticide compound in and on a finely divided inert solid support such as diatomaceous earth, bentonite, fuller's earth, attapulgite, and similar clays. For the preparation of wettable powders, the solid carrier is mechanically ground with the solid active compound hereof and a surface active dispersing agent.

Another novel aspect of the present invention involves the process by which certain of the useful pyrazine compounds are prepared. In particular, this process concerns the preparation of the ether and thioether substituted halo, chlorinated methyl compounds hereof wherein, in Formula A above, $m$ is 1 or 2, $n$ is at least 1, and $r$ is 1.

The simple displacement reaction in the preparation of ethers is quite well known, bieng commonly represented by the following equation $$ROM + R'X \rightarrow ROR' + MX$$

in which, for this purpose only, R and R' represent the carbon bearing portion of the desired ether moiety such as an alkyl group, M is usually an alkali metal, and X is halide, usually chloro. It is apparent that the oxide moiety simply displaces the halo group with concomitant ether and metal halide by-product formation.

Now it has been discovered that the customary displacement reaction just described does not occur in the introduction of ether functions on the pyrazine ring containing a chlorinated methyl group and the replaceable, ring halogen substituent. Instead, the ether forming nucleophile ($-O-R^1$ or $-S-R^1$, $R^1$ being above defined) adds to a carbon atom of the aromatic ring system at a position other than and without displacement of the ring halogen atom. Surprisingly, displacement of a chlorine atom from the chlorinated methyl grouping occurs. This marked and novel development can be further illustrated by the following equation:

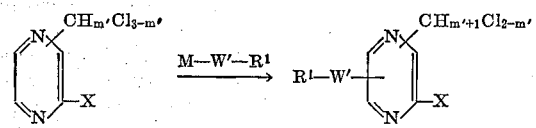

wherein each of X and $R^1$ is as previously defined, M is an alkali metal, W' is an oxygen atom or a sulfur atom, and $m'$ is the integer 0 or 1.

The presently considered novel process thus involves treating a halo- (di- or tri-) chlorinated methyl pyrazine with a compound of the formula $$M-W'-R^1$$

to give the corresponding halo- (mono- or di-) chlorinated methyl pyrazine ether or thioether product, the reactants and products corresponding to the previously depicted equation with its attendant definitions. In conducting the foregoing process, the reactant represented by the structural formula $$M-W'-R^1$$

is preferably contacted with the halo, chlorinated methyl starting compound on an equimolar basis. The reaction readily proceeds at temperatures of from about 10° C. to about 80° C. and is facilitated by the use of organic solvent such as the corresponding $R^1-OH$ alcohol or other loweralkanol.

Although the use of different proportions of reactants is not detrimental to the reaction, it is preferable to employ equimolar proportions or a slight excess of the $M-W'-R^1$ reactant. Similarly, the operable temperature range can be extended below 10° C. and above 80° C. without appreciable disadvantage; however, in most instances, depending primarily upon choice of solvent and reactants, relatively low temperatures of the given range—from about 15° C. to about 25° C.—are preferred, particularly in the initial stages of reaction.

Customary extraction, filtration, or other isolation procedures and purification steps are used to separate product from reaction mixture.

The reactants $M-W'-R^1$ are prepared for this purpose via the conventional reaction of the free alkali metal with the corresponding compound of the formula $H-W'-R^1$. This reaction is conveniently conducted in a portion of the medium which is to serve as the etherification reaction solvent, a further portion of such solvent being thereafter employed to add a solution of the desired pyrazine reactant.

This novel process substantially manifests itself and is thus extendably applicable as well in the preparation of bromo substituted compounds from the corresponding chloro derivatives. Thus, for one example, treatment of 2-chloro-3-dichloromethylpyrazine with hydrogen bromide in aqueous acetic acid affords both the expected 2-bromo-3-dichloromethylpyrazine simple displacement product as well as, surprisingly, 2-bromo-3-chloromethylpyrazine in which ring halogen displacement occurs together with the removal of a chlorine atom from the methyl group without concomitant addition of bromine to the opposite side of the ring system as observed in the foregoing etherification reactions. This process is illustrated as follows:

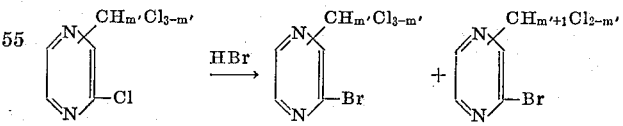

the same group definitions again applying.

The reaction conditions for this aspect of the novel process hereof involve bubbling the hydrogen bromide through a solution of the starting pyrazine compound in acetic acid. The temperature is usually maintained at between room temperature and about 100° C. during the hydrogen bromide addition. Customary extraction procedures isolate and recover the respective products.

The useful pyrazine compounds hereof are generally prepared from known starting compounds including 2-chloro-3-methylpyrazine and the attendant and corresponding isomers obtained through the chlorination of methylpyrazine, namely, 3-methyl-5-chloropyrazine and 3-methyl-6-chloropyrazine. Initial side chain, liquid phase chlorination of these starting compounds produces the corresponding polychloro substituted derivatives such as, for example, 2-chloro-3-dichloromethylpyrazine and 2-chloro-3-trichloromethylpyrazine from 2-chloro-3-methylpyrazine. The extent of chlorination in this instance can be controlled to a preference of products. Thus, initial chlorination yields predominately the dichloromethyl derivative and continued chlorination, but at more elevated temperatures upwards of 150° C. with actinic catalysis and without the use of solvent produces the trichloromethyl derivative in substantial yields.

Further chlorination of the 2-chloro-3-trichloromethyl-pyrazine results in the production of the corresponding 2,5 - dichloro-3-trichloromethyl, 2,6-dichloro-3-trichloromethyl, and 2,5,6-trichloro-3-trichloromethyl derivatives. Similar chlorination of the other isomeric starting compounds produces the correspondng products.

Such chlorination procedures are well known, being conducted by use of gaseous chlorine at temperatures of from 90° C. to 160° C. in liquid reaction medium such as can be provided by glacial acetic acid or a perhalohydrocarbon, for example, carbon tetrachloride. The ratio of chlorine to starting compound may vary from 3:1 to 15:1, preferably 5:1 to 10:1.

Alternate reaction of the 2-chloro-3-trichloromethyl-pyrazine with about an equimolar portion of the appropriate mercaptide reactant of the formula M—S—$R^1$, M being an alkali metal and $R^1$ is as previously defined, produces the corresponding addition-abnormal displacement product, 2-chloro-3-dichloromethyl-5 (or 6-)-mercapto-pyrazine with process novelty as set forth above. The mercapto moiety of these compounds can thereafter be oxidized such as with hydrogen peroxide in a mixture of acetic acid and acetic anhydride or with nitric acid to afford the corresponding sulfinyl and/or sulfonyl compounds. By varying the concentration and amount of peroxide used and the temperature, the reaction can be modified to a predominance of either the sulfinyl or sulfonyl derivatives. By utilizing an excess of mercaptide reactant, an isomeric product mixture containing the various monothioether substituted pyrazines are prepared which can each likewise be oxidized as above set forth.

Similarly, the novel treatment of 2-chloro-3-trichloromethylpyrazine with an equimolar proportion of the appropriate oxide reactant of the formula M—O—$R^1$, M being an alkali metal and $R^1$ as previously defined, the corresponding 2-chloro-3-dichloromethylpyrazine containing a 5 (or 6-)-ether group is produced.

In like manner, the same novel processes furnish the corresponding 2 - chloro - 3-monochloromethylpyrazines substituted in the 5 (or 6-)-position with the appropriate mercapto or ether grouping from 2-chloro-3-dichloromethylpyrazine. The mercapto moiety can thereafter be oxidized as above described.

By treating the 2-chloro-3-dichloromethylpyrazine prepared as described above with hydrogen bromide in acetic acid the corresponding 2-bromo-3-dichloromethyl-pyrazine compound is prepared together with the 2-bromo-3-monochloromethylpyrazine derivative, this again representing the process novelty which is outlined above. The foregoing etherification reactions can be applied to the thus prepared bromo substituted compounds to provide the corresponding bromo, chloromethylpyrazines containing the variously contemplated mercapto and oxide groupings.

These described reactions may also be conducted employing polyhalogenated starting compounds in lieu of the monohaloderivatives.

The mono-N-oxides are produced via conventional oxidative procedures such as by employing a polar solvent, for example, hexafluoroacetic anhydride and temperatures upwards of 60° C.

In all cases, the resultant products can be isolated from the reaction mixture via conventional techniques such as fractional distillation, precipitation, washing, and extraction and they may be further purified through recrystallization or further distillation.

Certain of the processes involved in the preparation of the novel compounds hereof are known per se and are documented, for example, by Wagner and Zook in Synthetic Organic Chemistry; John Wiley & Sons, Inc.; New York; 1953 on pages 98 et seq. and 801 et seq.

The presence of the several sites of potential substitution on the pyrazine ring and the generalized nature of the reactions by which substituents can be placed at these sites permits the existence of various molecular isomers. This isomerism occurs with regard to the actual placement of the various substituents on the pyrazine ring. Thus, there exist three isomers in the di-substituted series and six isomers in the preferred tri-substituted series. Each of these isomers, or mixtures thereof, are included within the scope of this invention. Generally, the methods of the present invention generate all of the forms and/or mixtures thereof, the specific isomers being separable, if desired, from the reaction mixture by virtue of their different physical properties via such conventional techniques as chromatography including thin layer and gas-liquid chromatography, fractional distillation, and crystallization.

In particular, the novel process presented herein whereby the halo, chlorinated methyl ethers and thioethers are formed generally produces several recoverable isomers. As one example, the treatment of 2-chloro-3-trichloromethylpyrazine with M—W'—$R^1$ reactant to give the corresponding ether or thioether of the starting compound produces the following: 2-chloro-3-dichloromethyl-5-(W'—$R^1$) - pyrazine, 2 - chloro - 3 - dichloromethyl - 6-(W'—$R^1$) - pyrazine, 2-chloro-3-(—W'—$R^1$)-5-dichloromethylpyrazine, and 2-chloro-3-(—W'—$R^1$)-6-dichloromethylpyrazine. A like situation applies in the other corresponding series of compounds.

Although in the instant specification reference to a specific isomer may not be given, it will be understood that each is included within the scope and spirit hereof. Despite these latter statements there exist certain preferred isomers. In the disubstituted series, the 2-halo-3-chlorinated methyl compounds represent these preferred isomers. In the preferred trisubstituted series, that is, those containing at least three different variety (e.g., halo, chlorinated methyl, and sulfur or oxygen bearing group) substituents, the same general isomeric preference prevails; the 2-halo-3-chlorinated methyl pyrazines containing an oxygen or sulfur bearing group of the 5- or 6-carbon atom thus being the compounds of chemical and biological choice.

The following examples serve to typify the nature of the present invention and are presented solely for the purpose of illustration.

EXAMPLE 1

Gaseous chlorine is passed through a refluxing solution of 25 grams of 2-chloro-3-methylpyrazine in glacial acetic acid for a period of about 2.5 hours. Thereafter, the reaction mixture is poured into water and extracted with several portions of carbon tetrachloride. The combined extracts are washed with bicarbonate solution, dried over sodium sulfate and concentrated in vacuum. The resultant oil residue is purified by vapor phase chromatography to give 2-chloro-3-dichloromethylpyrazine, B.P., 152° C. at 41 mm. Hg pressure.

*Elemental analysis.*—Calculated for $C_5H_3Cl_3N_2$ (percent): C, 30.4; H, 1.5; Cl, 53.9; N, 14.2. Found (percent): C, 30.6; H, 1.7; Cl, 53.5; N, 14.2.

EXAMPLE 2

Over a period of eight hours, 1440 grams of gaseous chlorine is passed into a refluxing solution of 600 grams of 2-chloro-3-methylpyrazine in glacial acetic acid. The reaction mixture is poured into water and extracted repeatedly with pentane. The extracts are combined and washed with sodium bicarbonate solution and then concentrated in vacuum.

The resultant oil is further chlorinated as above set forth but without the use of solvent and at temperatures of from 150° to 160° C. for several days with actinic (sunlamp) catalysis. Vapor phase chromatography on a Zonyl E–7 column, similar to that used in Example 1, gives 2-chloro-3-trichloromethylpyrazine, B.P. 167° C. at 40 mm. Hg pressure.

*Elemental analysis.*—Calculated for $C_5H_2Cl_4N_2$ (percent): C, 25.89; H, 0.87; Cl, 61.16; N, 12.08. Found (percent): C, 26.02; H, 0.91; Cl, 60.64; N, 11.95.

Further vapor phase chromatography indicated the presence in the crude oil also of 2-chloro-3-dichloromethylpyrazine.

Likewise, from 2-chloro-5-methylpyrazine and 2-chloro-6-methylpyrazine there are respectively obtained 2-chloro-5-trichloromethylpyrazine and 2-chloro-6-trichloromethylpyrazine.

Alternatively, the foregoing trichloromethylpyrazine products can be separated from the reaction mixture and recovered via fractional distillation with a vacuum jacketed column.

In a similar manner via the procedure of Example 1, from 2-chloro-5-methylpyrazine there is obtained 2-chloro-5-dichloromethylpyrazine and from 2 - chloro - 6 - methylpyrazine there is obtained 2-chloro-6-dichloromethylpyrazine.

EXAMPLE 3

Upon repeating the chlorination procedure as set forth in Example 1 upon 2-chloro-3-trichloromethylpyrazine there are obtained 2,5-dichloro-3-trichloromethylpyrazine, 2,6 - dichloro - 3 - trichloromethylpyrazine and 2,5,6 - trichloro-3-trichloromethylpyrazine which are separated by fractional distillation.

Alternatively, there can be employed the following procedure:

A 10 percent solution of methylpyrazine in carbon tetrachloride is vaporized in a preheater and introduced to a cylindrical reactor through one of a two inlet tube at a velocity of about 74 feet per second. Through the other tube is introduced chlorine in a 14 to 1 mole ratio with the methylpyrazine. Rapid and turbulent mixing is accomplished and the reactor is maintained at 425° C. The exiting products are condensed in a Dry Ice trap, freed of hydrogen chloride, chlorine, and carbon tetrachloride and fractionally distilled to give 2,5,6-trichloro-3-trichloromethylpyrazine, M.P. ca. 23° C., B.P. 170° C. at 27 mm. Hg pressure.

EXAMPLE 4

Through a solution of 10 grams of 2-chloro-3-dichloromethylpyrazine in 200 milliliters of acetic acid is bubbled dry hydrogen bromide for about 1.5 hours while maintaining the temperature of the mixture at between 45° C. and 60° C. The reaction mixture is allowed to return to room temperature, is filtered, and the filtrate is then poured over ice. Three successive extractions with diethyl ether are performed. The extracts are combined, washed with water, and dried over sodium sulfate. Evaporation of solvent yields 2-bromo-3-dichloromethylpyrazine and 2-bromo-3-chloromethylpyrazine which are separated and recovered by fractional distillation.

Similarly by repeating the above procedure upon 2-chloro-3-trichloromethylpyrazine there are obtained 2-bromo - 3 - trichloromethylpyrazine and 2 - bromo - 3-dichloromethylpyrazine.

EXAMPLE 5

A solution of 10 grams (0.05 mole) of 2-bromo-3-chloromethylpyrazine in 100 millilters of carbon tetrachloride is cooled to a temperature of about −10° C. and thereafter a solution containing 0.05 gram-mole of bromine in carbon tetrachloride is added slowly to the well stirred solution. During the 3 hour addition the temperature is maintained at or below 10 to 15° C. After the addition of bromine is complete, the reaction mixture is allowed to stand at room temperature for about 1 hour after which time it is washed with water and then with two portions of 20 percent sodium hydroxide solution. Upon removal of the solvent by evaporation, the following products are obtained by fractional distillation: 2,5 - dibromo-3-chloromethylpyrazine, 2,6-dibromo-3-chloromethylpyrazine, and 2,5,6 - tribromo - 3 - chloromethylpyrazine.

Similarly the correspondig bromo compounds of the 3-dichloromethylpyrazine and 3-trichloromethylpyrazine products are obtained.

EXAMPLE 6

To a solution of 10 grams of 2-chloro-3-trichloromethylpyrazine in 150 milliliters of hexafluoroacetic anhydride in slowly added, with stirring, 14.7 grams of 30 percent hydrogen peroxide. The reaction mixture ultimately reaching 50° to 60° C. is heated on the steam bath for 1 to 2 hours and thereafter poured over ice. The resultant cooled reaction mixture is thereafter filtered, washed with water, and dried to give as a white solid, the mono N-oxide of 2-chloro-3-dichloromethylpyrazine.

*Elemental analysis.*—Calc'd for $C_5H_2Cl_4N_2O$ (percent): C, 24.22; H, 0.82; Cl, 57.21; N, 11.30; O, 6.45. Found (percent): C, 24.40; H, 0.90; Cl, 56.98; N, 11.24.

In an analogous manner from 2-chloro-3-dichloromethylpyrazine there is obtained, as a yellow oil, the mono N-oxide of 2-chloro-3-trichloromethylpyrazine.

*Elemental analysis.*—Calc'd for $C_5H_3Cl_3N_2O$ (percent): C, 28.13; H, 1.41; Cl, 49.83; N, 13.13; O, 7.50. Found (percent): C, 28.3; H, 1.61; Cl, 49.68; N, 13.23.

In a similar manner to that herebefore described, the mono N-oxide of the other halogenated-chlorinated methylpyrazine compounds hereof are prepared.

EXAMPLE 7

A methanolic solution of sodium methoxide is prepared by dissolving 1.15 grams (0.05 mole) of sodium metal in 75 milliliters of methanol and this solution is slowly added with stirring to a solution containing 11.6 grams (0.05 mole) of 2-chloro-3-trichloromethylpyrazine in 100 milliliters of methanol. The reaction mixture is refluxed for 30 minutes after which time it is poured over ice. The several combined ethyl ether extracts are washed and evaporated to give, as a yellow oil, 2-chloro-3-dichloromethyl-5-methoxy-pyrazine, 2-chloro - 3 - dichloromethyl - 6 - methoxypyrazine, 2 - chloro - 3 - methoxy - 5-dichloromethylpyrazine, and 2-chloro - 3 - methoxy - 6-dichloromethylpyrazine which can be separated through fractional recrystallization in methanol.

Similarly, the reaction just described can be utilized substituting 2,5-(or 6)dichloro-3-trichloromethylpyrazine, or the corresponding dibromo derivatives prepared as described hereinabove containing one available site of substitution on the pyrazine ring, to prepare the corresponding methoxy-dihalogenated-dichloro-methylpyrazine products otherwise corresponding thereto.

EXAMPLE 8

A sodium methoxide solution is prepared as described in Example 7 with 0.23 gram (0.01 mole) sodium in 60 milliliters of methanol and added dropwise to a solution of 2.32 grams (0.01 mole) of 2-chloro-3-trichloromethylpyrazine in 230 milliliters of methanol which is maintained at 5° C. The mixture is stirred at from 1° to 7° C. for about 2 hours and then poured into ice water. After allowing the resultant mixture to stand at room temperature for about 1 to 2 hours, it is extracted with ethyl ether. The resulting extract is then washed and dried over sodium sulfate. Evaporation of the ether gives a yellow oil which furnishes the same products as obtained via the procedure of Example 7. Further analysis indicates the presence of some 2-methoxy-3-trichloromethylpyrazine. These products are separated and isolated via fractional distillation.

EXAMPLE 9

A methanolic solution of sodium methoxide is prepared by dissolving 0.23 gram (0.01 mole) of sodium metal in 60 milliliters of methanol and this solution is added dropwise with stirring to a solution containing 1.98 grams (0.01 mole) of 2-chloro-3-dichloromethylpyrazine in 190 milliliters of methanol at 5° C. The reaction mixture is stirred for about 2 hours while maintaining this temperature. It is then poured over ice and allowed to stand at room temperature for about 1.5 hours. Extractions with ether and subsequent work-up as described in Examples 7 and 8 provide 2-chloro-3-chloromethyl-5-methoxypyrazine, 2-chloro - 3 - chloromethyl-6-methoxypyrazine, 2-chloro-3-methoxy-5-chloromethylpyrazine, and 2-chloro-3-methoxy-6-chloromethylpyrazine which can be separated through fractional recrystallization in methanol.

Similarly, the reaction just described can be utilized substituting a 2,5-(or 6)dichloro-3-dichloromethylpyrazine, or the corresponding dibromo derivatives prepared as described hereinabove containing one available site of substitution on the pyrazine ring, to prepare the corresponding methoxy-dihalogenated - monochloromethylpyrazine products otherwise corresponding thereto.

EXAMPLE 10

In a manner similar to that described in Examples 7, 8, or 9, there are obtained, inter alia, the following oxygen ether compounds of the chloro (or bromo)-chlorinated methylpyrazine starting compounds upon reaction of the starting compounds with the corresponding alkali metal alkoxide reactant in its corresponding alcohol:

2-chloro-3-dichloromethyl-5-ethoxypyrazine
2-chloro-3-dichloromethyl-6-ethoxypyrazine
2-chloro-3-chloromethyl-5-ethoxypyrazine
2-chloro-3-chloromethyl-6-ethoxypyrazine
2-chloro-3-dichloromethyl-5-isopropoxypyrazine
2-chloro-3-dichloromethyl-6-isopropoxypyrazine
2-chloro-3-chloromethyl-5-isopropoxypyrazine
2-chloro-3-chloromethyl-6-isopropoxypyrazine
2-chloro-3-dichloromethyl-5-n-hexyloxypyrazine
2-chloro-3-dichloromethyl-6-n-hexyloxypyrazine
2-chloro-3-chloromethyl-5-n-hexyloxypyrazine
2-chloro-3-chloromethyl-6-n-hexyloxypyrazine
2-chloro-3-dichloromethyl-5-cyclohexyloxypyrazine
2-chloro-3-dichloromethyl-6-cyclohexyloxypyrazine
2-chloro-3-chloromethyl-5-cyclohexyloxypyrazine
2-chloro-3-chloromethyl-6-cyclohexyloxypyrazine The corresponding phenoxy compounds can be prepared according to the following representative procedure:

A solution containing 4.7 grams (0.05 mole) of phenol, 11.6 grams (0.05 mole) of 2-chloro-3-trichloromethylpyrazine, and 2 grams (0.05 mole) of sodium hydroxide in a mixture of 15 milliliters of water and 70 milliliters of isopropanol is heated under reflux for about 70 minutes. Thereafter, a portion of aqueous hydrochloric acid is added to the reaction mixture and the resultant mixture is filtered, the filtrate being recrystallized from hexane to obtain 2-chloro-3-dichloromethyl-5-phenoxypyrazine and 2-chloro-3-dichloromethyl-6-phenoxypyrazine.

EXAMPLE 11

A solution containing 2.4 grams (0.05 mole) of methanethiol and 1.15 grams (0.05 mole) of sodium metal which are dissolved in about 75 milliliters of isopropanol is slowly added at room temperature to a solution containing 11.6 grams of 2-chloro-3-trichloromethylpyrazine in about 125 milliliters of isopropanol. Thereafter, the reaction mixture is stirred at room temperature for about 2 hours and then poured into ice water, the resultant mixture being extracted with ethyl ether. The extracts are dried and evaporated to give 2-chloro-3-dichloromethyl-5-methylthiopyrazine, 2-chloro - 3 - dichloromethyl-6-methylthiopyrazine, 2-chloro-3-methylthio - 5 - dichloromethylpyrazine, and 2-chloro-3-methylthio-6-dichloromethyl- pyrazine which can be separated upon fractional recrystallization. The elemental analysis of the predominant products follows:

*Elemental analysis.*—Calc'd for $C_6H_5Cl_3N_2S$ (percent): C, 29.6; H, 2.0; Cl, 43.8; N, 11.5; S, 13.1. Found (percent): C, 29.47; H, 1.69; Cl, 43.58; N, 11.76; S, 13.26.

Further analyses indicate the presence of small amounts of 2-methylthio-3-trichloromethylpyrazine which is separated as above described.

Methyl mercaptan (0.14 gram) is added to 0.16 gram of sodium methylate in 10 milliliters of methanol and this is added to 2,5,6-trichloro-3-trichloromethylpyrazine in 25 milliliters of methanol at 10° C. The reaction mixture is allowed to warm to room temperature. After one hour the mixture is poured into ice water. The crude product is subjected to vapor phase chromatography to give, as one product, 2,5-dichloro - 3 - trichloromethyl-6-methylthiopyrazine.

EXAMPLE 12

A solution containing 0.5 gram (0.01 mole) of methanethiol and 0.2 gram (0.01 mole) of sodium metal which are dissolved in about 25 milliliters of isopropanol is slightly warmed and thus slowly added to a solution containing 2.0 grams (0.01 mole) of 2-chloro-3-dichloromethylpyrazine in about 75 milliliters of isopropanol which is maintained at 5° C. The addition is accomplished over a period of about 45 minutes and thereafter the reaction mixture is stirred at from 0° to 5° C. for about 30 minutes and then poured into ice water. Subsequent ether extractions and work-up provides 2-chloro-3-chloromethyl-5-methylthiopyrazine, 2-chloro-3-chloro-methyl-6-methylthiopyrazine, 2 - chloro - 3 - methylthio-5-chloromethylpyrazine, and 2 - chloro - 3 - methylthio-6-chloromethylpyrazine which can be separated upon fractional distillation.

EXAMPLE 13

A reaction is conducted substantially as set forth in Examples 11 and 12 with 2-chloro-3-trichloromethylpyrazine, sodium, and n-hexylmercaptan with isopropanol as solvent except the reaction mixture is refluxed for 3 to 4 hours. Subsequent use of diethyl ether extraction yields 2-chloro-3-dichloromethyl-5-n-hexylthiopyrazine, 2-chloro - 3 - dichloromethyl - 6 - n - hexylthiopyrazine, 2-chloro - 3 - n - hexylthio - 5 - dichloromethylpyrazine, and 2-chloro-3-n-hexylthio-6-dichloromethylpyrazine.

EXAMPLE 14

Upon the preparation and substitution of the corresponding alkali metal mercaptide reactant and the use of appropriate pyrazine reactant in the procedure substantially as described in the foregoing Examples 11, 12, and 13, there are obtained, inter alia, the following thioether products:

2-chloro-3-dichloromethyl-5-ethylthiopyrazine
2-chloro-3-dichloromethyl-6-ethylthiopyrazine
2-chloro-3-chloromethyl-5-ethylthiopyrazine
2-chloro-3-chloromethyl-6-ethylthiopyrazine
2-chloro-3-chloromethyl-5-n-hexylthiopyrazine
2-chloro-3-chloromethyl-6-n-hexylthiopyrazine
2-chloro-3-dichloromethyl-5-cyclohexylthiopyrazine
2-chloro-3-chloromethyl-5-cyclohexylthiopyrazine
2-chloro-3-dichloromethyl-6-cyclohexylthiopyrazine
2-chloro-3-chloromethyl-6-cyclohexylthiopyrazine
2-chloro-3-dichloromethyl-5-dodecylthiopyrazine
2-chloro-3-chloromethyl-5-dodecylthiopyrazine
2-chloro-3-dichloromethyl-6-dodecylthiopyrazine
2-chloro-3-chloromethyl-6-dodecylthiopyrazine
2-chloro-3-dichloromethyl-5-phenylthiopyrazine
2-chloro-3-chloromethyl-5-phenylthiopyrazine
2-chloro-3-dichloromethyl-6-phenylthiopyrazine
2-chloro-3-chloromethyl-6-phenylthiopyrazine
2-chloro-3-dichloromethyl-5-p-bromopheylthiopyrazine
2-chloro-3-chloromethyl-5-p-bromophenylthiopyrazine 2-chloro-3-dichloromethyl-6-p-bromophenylthiopyrazine
2-chloro-3-chloromethyl-6-p-bromophenylthiopyrazine
2-chloro-3-dichloromethyl-5-(2-naphthyl)thiopyrazine
2-chloro-3-dichloromethyl-6-(2-naphthyl)thiopyrazine
2-chloro-3-chloromethyl-5-(2-naphthyl)thiopyrazine
2-chloro-3-chloromethyl-6-(2-naphthyl)thiopyrazine

EXAMPLE 15

Upon repeating the procedure set forth in Example 6 upon those compounds prepared in Examples 7, 8, 9, and 10 hereof, the corresponding mono N-oxides otherwise corresponding thereto are prepared.

EXAMPLE 16

To a solution of 1 gram of 2-chloro-3-dichloromethyl-5-(2-naphthyl)thiopyrazine in 15 milliliters each of glacial acetic acid and acetic anhydride is added 15 milliliters of 30 percent hydrogen peroxide. The temperature of the reaction mixture is allowed to rise to 95° to 100° C. over forty minutes after which time it is poured over ice. Several extractions are made with methylene chloride followed by washing (with water) of the extracts and evaporation. Diethyl ether is added to methylene chloride residue, the resultant mixture is filtered and the supernatant evaporated to yield 2-chloro-3-dichloromethyl-5-(2-naphthyl)sulfonylpyrazine.

*Elemental analysis.*—Calc'd for $C_{15}H_9Cl_3N_2O_2S$ (percent): C, 46.5; H, 2.3; Cl, 27.5; N, 7.2; O, 8.2; S, 8.3. Found (percent): C, 44.27; H, 2.53; Cl, 26.22; N, 7.27; S, 7.32.

EXAMPLE 17

The procedure of Example 16 is repeated except the reaction is conducted in a water bath and the temperature kept between 20° and 30° C. for 24 hours. Subsequent isolation yields a product identical to that prepared in Example 16.

EXAMPLE 18

In like manner, upon substituting the other thioether compounds prepared as described above in Example 11, 12, 13 and 14 in lieu of the 2-chloro-3-dichloromethyl-5-(2-naphthyl)thiopyrazine the corresponding substituted sulfonylpyrazine products are obtained, to-wit:

2-chloro-3-dichloromethyl-5-methylsulfonylpyrazine
2-chloro-3-dichloromethyl-6-methylsulfonylpyrazine
2-chloro-3-chloromethyl-5-methylsulfonylpyrazine
2-chloro-3-chloromethyl-6-methylsulfonylpyrazine
2-chloro-3-dichloromethyl-5-n-hexylsulfonylpyrazine
2-chloro-3-dichloromethyl-6-n-hexylsulfonylpyrazine
2-chloro-3-dichloromethyl-5-ethylsulfonylpyrazine
2-chloro-3-dichloromethyl-6-ethylsulfonylpyrazine
2-chloro-3-chloromethyl-5-ethylsulfonylpyrazine
2-chloro-3-chloromethyl-6-ethylsulfonylpyrazine
2-chloro-3-chloromethyl-5-n-hexylsulfonylpyrazine
2-chloro-3-chloromethyl-6-n-hexylsulfonylpyrazine
2-chloro-3-dichloromethyl-5-cyclohexylsulfonylpyrazine,
and so forth.

EXAMPLE 19

Upon repeating the oxidative procedures set forth in Examples 16 and 17 above except conducting the reaction at from 0° to 25° C. and for only several hours and employing about one-third the quantity of hydrogen peroxide, there can be obtained 2-chloro-3-dichloromethyl-5-(2-naphthyl)sulfinylpyrazine.

EXAMPLE 20

In like manner, the foregoing oxidative procedure (Example 19) can be utilized substituting the other thio ethers hereof to furnish the corresponding substituted sulfinyl derivatives thereof, for example:

2-chloro-3-dichloromethyl-5-methylsulfinylpyrazine
2-chloro-3-dichloromethyl-6-methylsulfinylpyrazine
2-chloro-3-chloromethyl-5-methylsulfinylpyrazine
2-chloro-3-chloromethyl-6-methylsulfinylpyrazine
2-chloro-3-dichloromethyl-5-n-hexylsulfinylpyrazine
2-chloro-3-dichloromethyl-6-n-hexylsulfinylpyrazine
2-chloro-3-dichloromethyl-5-ethylsulfinylpyrazine
2-chloro-3-dichloromethyl-6-ethylsulfinylpyrazine
2-chloro-3-chloromethyl-5-ethylsulfinylpyrazine
2-chloro-3-chloromethyl-6-ethylsulfinylpyrazine
2-chloro-3-chloromethyl-5-n-hexylsulfinylpyrazine
2-chloro-3-chloromethyl-6-n-hexylsulfinylpyrazine
2-chloro-3-dichloromethyl-5-cyclohexylsulfinylpyrazine,
and so forth.

EXAMPLE 21

The components, 25 parts by weight of 2-chloro-3-dichloromethyl-5-methoxypyrazine, 62 parts of fuller's earth, 10 parts of diatomaceous earth, 2 parts of an alkyl aryl sulfonate (Naccanol NR) and 1 part of a polymerized sodium salt of a substituted benzoid alkyl sulfonic acid (Daxad No. 27), are mechanically mixed and ground together to prepare a concentrate composition in the form of a wettable powder.

Similarly, 25 parts by weight of 2-chloro-3-dichloromethyl-5-n-hexylsulfonylpyrazine, 65 parts xylene and 10 parts of a dimeric alkylated aryl polyether alcohol (Triton X–155) are mechanically mixed together to prepare a liquid emulsifiable concentrate composition.

In a like manner, 6 parts by weight of 2-chloro-3-dichloromethyl-6-n-dodecylsulfonylpyrazine, 0.1 part of Naccanol NR, 0.1 part of Daxad No. 27 and 200 parts of water are ballmilled together to prepare a concentrate composition in the form of a water-dispersible liquid suspension.

These concentrate compositions may be further diluted in their concentrate state to form dust and/or granular compositions or they may be dispersed in water to prepare aqueous compositions which have desirable wetting and penetrating properties. These compositions are adapted to be employed to treat pests and/or their habitats in pesticidal concentrations.

In like manner, the other compounds contemplated by the present invention as set forth hereinabove can be formulated in concentrate form as set forth in the present example and thus serve as toxicant carriers for further dilution before application to target pests.

EXAMPLE 22

Following the procedure of Example 21, a series of water-emulsifiable concentrates are prepared, each containing one of the toxicants, the mono N-oxide of 2-chloro-3-trichloromethylpyrazine, 3-dichloromethyl-5-phenylthio-6-chloropyrazine, the mono N-oxide of 2,5-dichloro-3-trichloromethylpyrazine, the mono N-oxide of 2,6-dichloro-3-trichloromethylpyrazine, 2-chloro-3-dichloromethyl-5-n-hexylsulfonylpyrazine, 2-chloro-3-dichloromethyl-6-n-hexylsulfonylpyrazine, 2-chloro-3-dichloromethyl-5-n-dodecylsulfonylpyrazine, and 2-chloro-3-dichloromethyl-6-n-dodecylsulfonylpyrazine. These concentrates are thereafter dispersed in water to form corresponding aqueous dispersions each containing 500 parts of the named toxicant compound per million parts of the ultimate aqueous dispersion. Each of said aqueous dispersions is thereafter applied so as to wet thoroughly the above-ground parts of separate groups of cranberry bean (*Phaseolus vulgaris* L.) plants which are heavily infested with the adult stages of two-spotted spider mite (*Tetranychus bimaculatus*). A further group of cranberry bean plants which are also heavily infested with the two-spotted spider mite is left untreated to serve as checks. The treated plants and the check plants are held for 3 to 6 days and thereafter observed to determine mortality of the mites. It is observed and recorded that the mono N-oxide of 2-chloro-3-trichloromethylpyrazine achieves 95 percent kill of the two-spotted spider mite and a 100 percent kill is observed and recorded for each of the other named compounds. Each of the check plant species is found to still be in a state of complete mite infestation.

EXAMPLE 23

A series of aqueous dispersions are prepared as set forth in Example 22, each containing 100 parts per million of one of 2-chloro-3-dichloromethyl-5-n-hexylsulfonylpyrazine,
2-chloro-3-dichloromethyl-6-n-hexylsulfonylpyrazine,
2-chloro-3-dichloromethyl-5-cyclohexylsulfonylpyrazine,
2-chloro-3-dichloromethyl-6-cyclohexylsulfonylpyrazine,
2-chloro-3-dichloromethyl-5-n-dodecylsulfonylpyrazine,
2-chloro-3-dichloromethyl-6-n-dodecylsulfonylpyrazine,
2-chloro-3-dichloromethyl-5-(p-bromophenyl)sulfonylpyrazine,
2-chloro-3-dichloromethyl-6-(p-bromophenyl)sulfonylpyrazine,
3-dichloromethyl-5-chloro-6-(p-bromophenylthio) pyrazole,
3-dichloromethyl-5-(p-bromophenylthio)-6-chloropyrazine,
2-chloro-3-dichloromethyl-5-(2-naphthyl)sulfonylpyrazine,
2-chloro-3-dichloromethyl-6-(2-naphthyl)sulfonylpyrazine,
2-chloro-3-dichloromethyl-5-phenylsulfonylpyrazine, and
2-chloro-3-dichloromethyl-6-phenylsulfonylpyrazine.

Suitable nutrient agar supports are prepared which are adapted to support and seeded with the fungal microorganism incidental to rice blast as well as the organisms *Staphylococcus aureus*, *Candida albicans*, *Tricophyton mentagrophytes*, and *Cercosphora beticola*. Droplets of each of the aqueous dispersions prepared as before described are spread over the surface of separate groups of each of the agar nutrients supporting each of the microorganisms. It is observed and recorded that each of the toxicant materials provides 100 percent control of each of the microorganisms named at the concentrations indicated, whereas in check agar nutrients supporting the identical microorganisms, but not receiving treatment with the named compounds, it is observed that the microorganisms are in an active state of growth.

EXAMPLE 24

Separate groups of white mice which are each naturally infested with mouse tapeworm (Hymenolepis Spp.) are fed a series of medicated diets, one containing 2-chloro-3 - dichloromethyl-5-n-hexylsulfonylpyrazine, another 2-chloro - 3-dichloromethyl-6-n-hexylsulfonylpyrazine, another 2 - chloro-3-dichloromethyl-5-(2-naphthyl)sulfonylpyrazine, and a fourth 2-chloro-3-dichloromethyl-6-(2-naphthyl)sulfonylpyrazine such that one of said groups of mice receive a diet containing 0.06 percent by weight of one of said compounds. After keeping the test mice on the medicated diets for seven days they are sacrificed and observations and recordations are made for the degree of infestation of the tapeworm parasite in the intestinal tract. None are found indicating that each of the toxicant compounds produces a 100 percent reduction of the parasite tapeworm at the concentrations indicated.

EXAMPLE 25

Aqueous compositions which are diluted to 2 parts per million parts of total composition of each of the mono N-oxide of 2-chloro-3-dichloromethylpyrazine, the mono N-oxide of 2-chloro-3-trichloromethylpyrazine, the mono N-oxide of 2,5-dichloro-3-trichloromethylpyrazine, the mono N-oxide of 2,6-dichloro-3-trichloromethylpyrazine, 2-chloro-3-dichloromethyl-5-n-hexylsulfonylpyrazine, and 2 - chloro-3-dichloromethyl-6-n-hexylsulfonylpyrazine are prepared. Organisms of the type daphnia are placed in each of these water compositions containing the named toxicant compounds and are exposed for 24 hours after which time final mortality and other observations are made. Concurrently with these experiments, organisms of daphnia are placed in similar water compositions but not containing any toxicant compound as checks. At the end of the requisite period, it is observed and recorded that a 100 percent kill is achieved with each of the test compounds while in the check compositions the organism daphnia is found to be in healthy and regenerative growth.

EXAMPLE 26

A series of tests are set up to determine the antibacterial efficacy of 2-chloro-3-chloromethyl-5-methoxypyrazine and 2 - chloro - 3-chloromethyl-6-methoxypyrazine. Separate groups of support media are inoculated with the bacteria *Bacillus subtilis, Staphylococcus aureus, Aspergillis terreus, Candida pelliculosa, Pullularia pullulans,* and *Rhizopus nigricans* and growth is allowed to be established. Each of these media is then separately treated with a 0.05 percent solution of each of the named compounds. Observations are made as to the protection manifested by each compound against each bacteria organism. It is found that with each of the two compounds tested, an inhibition of the growth of each of the bacteria in the growth medium is achieved.

Similar results are obtained utilizing 2-chloro-3-dichloromethyl-5-(p-bromophenyl)sulfonylpyrazine and 2-chloro - 3-dichloromethyl-6-(p-bromophenyl)sulfonylpyrazine separately with each of the bacteria *Bacillus subtilis, Staphylococcus aureus, Aspergillus terreus, Candida pelliculosa,* and *Pullularia pullulans.*

Similar growth inhibitative results are obtained upon *Bacillus subtilis, Staphylococcus aureus, Aspergillus terreus, Pullularia pullulans* separately with each of 2-chloro-3 - dichloromethyl - 5-cyclohexylsulfonylpyrazine and 2-chloro-3-dichloromethyl-6-cyclohexylsulfonylpyrazine.

Through the separate use of 2-chloro-3-dichloromethyl-5-n-hexylsulfonylpyrazine and 2-chloro-3-dichloromethyl-6-n-hexylsulfonylpyrazine, there is achieved inhibition of the growth of each of *Bacillus subtilis, Staphylococcus aureus, Aspergillus terreus, Candida pelliculosa,* and *Pullularia pullulans.*

Similarly, with separate use of each of 2-chloro-3-dichloromethyl-5-(2-naphthyl)sulfonylpyrazine and 2-chloro-3-dichloromethyl-6-(2-naphthyl)sulfonylpyrazine there is obtained inhibition of the growth of each of *Bacillus sibtilis,* and *Staphylococcus aureus* when tested according to the foregoing procedures.

The inhibition of the growth of *Aspergillus terreus, Candida pelliculosa* and *Pullularia pullulans* is achieved by the separate administration of 2,5-dichloro-3-dichloromethyl-6-methoxypyrazine to the support media.

Utilizing a 0.05 percent by weight of 3-dichloromethyl-5-methylthio-6-chloropyrazine administered solution, there is achieved the inhibition of the growth of *Aspergillus terreus* and *Pullularia pullulans* when separately tested according to the procedures set forth hereinbefore. Compositions having a concentration of 0.05 percent by weight of each of the mono N-oxide of 2,5-dichloro-3-trichloromethylpyrazine and 2,6-dichloro-3-trichloromethylpyrazine separately give inhibition of the growth of each of the bacteria *Bacillus subtilis, Salmonella typhosa,* and *Staphylococcus aureus* and a complete kill of the bacteria of *Aspergillus terreus, Candida pelliculosa, Pullularia pullulans* and *Rhizopus nigricans.*

What is claimed is:

1. A compound of the formula 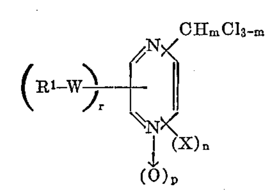 wherein W is an oxygen atom, a sulfur atom, a sulfinyl group, or a sulfonyl group;

$R^1$ is:

(a) alkyl, said alkyl being a straight or branched chain saturated aliphatic hydrocarbon containing from 1 to 12 carbon atoms, inclusive;
(b) cyclohexyl;
(c) phenyl, naphthyl or substituted phenyl and naphthyl, said substituents selected from the group consisting of chlorine, bromine, nitro, cyano and amino;
(d) lower alkyl substituted phenyl and naphthyl, said lower alkyl substituent containing from 1 to 6 carbon atoms inclusive; or
(e) aralkyl, wherein said aryl portion is benzene nucleus and said alkyl portion is lower alkyl of 1 to 6 carbon atoms inclusive;

X is bromo or chloro;
$m$ is the integer 0, 1, or 2;
$n$ is the integer 1, 2, or 3;
$p$ is the integer 0 or 1; and
$r$ is the integer 0 or 1;
the sum of $n$ and $r$ being the integer 1, 2, or 3;
provided that W is other than a sulfur atom when $p$ is the integer 1.

2. A compound according to claim 1 wherein $m$ is the integer 0, $n$ is the integer 2, $p$ is the integer 0, $r$ is the integer 0, and X is chloro.

3. A compound according to claim 1 wherein $m$ is the integer 1, $n$ is the integer 2, $p$ is the integer 0, $r$ is the integer 0, and X is chloro.

4. Compounds according to claim 1 wherein at least one of $p$ and $r$ is the integer 1.

5. Compounds according to claim 4 wherein $m$ is the integer 0 or 1, $n$ is the integer 1 or 2, and if $r$ is the integer 1, W is an oxygen atom or a sulfur atom.

6. A compound according to claim 4 wherein $m$ is the integer 1, $n$ is the integer 1, $p$ is the integer 1, $r$ is the integer 0, and X is chloro.

7. A compound according to claim 4 wherein $m$ is the integer 1, $n$ is the integer 1, $p$ is the integer 0, $r$ is the integer 1, X is chloro, W is an oxygen atom, and $R^1$ is methyl.

8. A compound according to claim 4 wherein $m$ is the integer 2, $n$ is the integer 1, $p$ is the integer 0, $r$ is the integer 1, X is chloro, W is an oxygen atom, and $R^1$ is methyl.

9. A compound according to claim 4 wherein $m$ is the integer 1, $n$ is the integer 1, $p$ is the integer 0, $r$ is the integer 1, X is chloro, W is a sulfur atom, and $R^1$ is methyl.

10. A compound according to claim 4 wherein $m$ is the integer 1, $n$ is the integer 1, $p$ is the integer 0, $r$ is the integer 1, X is chloro, W is a sulfur atom, and $R^1$ is n-hexyl.

11. A compound according to claim 4 wherein $m$ is the integer 1, $n$ is the integer 1, $p$ is the integer 0, $r$ is the integer 1, X is chloro, W is a sulfur atom, and $R^1$ is cyclohexyl.

12. A compound according to claim 4 wherein $m$ is the integer 1, $n$ is the integer 1, $p$ is the integer 0, $r$ is the integer 1, X is chloro, W is a sulfur atom, and $R^1$ is p-bromophenyl.

13. A compound according to claim 4 wherein $m$ is the integer 2, $n$ is the integer 1, $p$ is the integer 0, $r$ is the integer 1, X is chloro, W is a sulfur atom, and $R^1$ is p-bromophenyl.

14. A compound according to claim 4 wherein $m$ is the integer 1, $n$ is the integer 1, $p$ is the integer 0, $r$ is the integer 1, X is chloro, W is a sulfur atom, and $R^1$ is phenyl.

15. A compound according to claim 4 wherein $m$ is the integer 1, $n$ is the integer 1, $p$ is the integer 0, $r$ is the integer 1, X is chloro, W is a sulfur atom, and $R^1$ is n-dodecyl.

16. A compound according to claim 4 wherein $m$ is the integer 1, $n$ is the integer 1, $p$ is the integer 0, $r$ is the integer 1, X is chloro, W is a sulfonyl group, and $R^1$ is n-hexyl.

17. A compound according to claim 4 wherein $m$ is the integer 1, $n$ is the integer 1, $p$ is the integer 0, $r$ is the integer 1, X is chloro, W is a sulfonyl group, and $R^1$ is cyclohexyl.

18. A compound according to claim 4 wherein $m$ is the integer 1, $n$ is the integer 1, $p$ is the integer 0, $r$ is the integer 1, X is chloro, W is a sulfonyl group, and $R^1$ is p-bromophenyl.

19. A compound according to claim 4 wherein $m$ is the integer 1, $n$ is the integer 1, $p$ is the integer 0, $r$ is the integer 1, X is chloro, W is a sulfonyl group, and $R^1$ is phenyl.

20. A compound according to claim 4 wherein $m$ is the integer 1, $n$ is the integer 1, $p$ is the integer 0, $r$ is the integer 1, X is chloro, W is a sulfonyl group, and $R^1$ is n-dodecyl.

21. A method which comprises treating a halo, chlorinated methyl pyrazine of the formula:

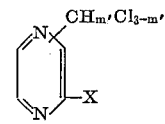

with about an equimolar quantity of a compound of the formula $$M—W'—R^1$$

to give the corresponding halo, chlorinated methyl pyrazine ether product of the formula

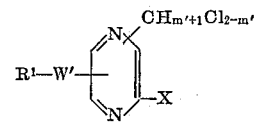

wherein, in the above formulas, $m$ is the integer of 0 or 1;
X is bromo or chloro;
W' is an oxygen atom or a sulfur atom;
$R^1$ is
(a) alkyl, said alkyl being a straight or branched chain saturated aliphatic hydrocarbon containing from 1 to 12 carbon atoms, inclusive;
(b) cyclohexyl;
(c) phenyl naphthyl or substituted phenyl and naphthyl, said substituents selected from the group consisting of chlorine, bromine, nitro, cyano and amino;
(d) lower alkyl substituted phenyl and naphthyl, said lower alkyl substituent containing from 1 to 6 carbon atoms inclusive; or
(e) aralkyl, wherein said aryl portion is a benzene nucleus and said alkyl portion is lower alkyl of 1 to 6 carbon atoms inclusive; and M is an alkali metal, and thereafter isolating the halo, chlorinated methyl pyrazine ether product.

22. A method which comprises treating a chloro, chlorinated methyl pyrazine of the formula

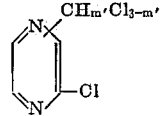

with about an equimolar quantity of hydrogen bromide to give the corresponding bromo, chlorinated methyl pyrazine product of the formula
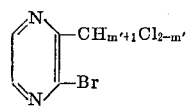
wherein, in the above formulas, $m'$ is the integer 0 or 1, and thereafter isolating the bromo, chlorinated methyl pyrazine product.
No references cited.
NICHOLAS S. RIZZO, Primary Examiner
U.S. Cl. X.R.
424—250